United States Patent [19]

Patashnick et al.

[11] 4,391,338
[45] Jul. 5, 1983

[54] MICROBALANCE AND METHOD FOR MEASURING THE MASS OF MATTER SUSPENDED WITHIN A FLUID MEDIUM

[76] Inventors: Harvey Patashnick, 27 Crow Ridge Rd., Voorheesville, N.Y. 12186; Georg Rupprecht, R.D. #3, Apartment 67, Altamont, N.Y. 12009

[21] Appl. No.: 137,424
[22] Filed: Apr. 4, 1980
[51] Int. Cl.³ .................. G01G 3/14; G01N 31/00
[52] U.S. Cl. .................................. 177/210 FP; 73/28
[58] Field of Search ................ 177/210 FP; 73/28

[56] References Cited
U.S. PATENT DOCUMENTS 3,715,911  2/1973  Chaun ........................................ 73/28
3,744,297  7/1973  Hanson et al. ............................ 73/28
3,926,271  12/1975 Patashnick ..................... 177/210 FP
3,957,469  5/1976  Nebash ................................. 73/28 X
4,294,105  10/1981 Kelly ............................. 177/210 FP Primary Examiner—George H. Miller, Jr.
Attorney, Agent, or Firm—Heslin & Watts

[57] ABSTRACT

The oscillating element in a microbalance is provided with a filter on its oscillating end for the entrapment of matter whose mass is to be determined by passing the medium containing such matter therethrough. The oscillating element itself is hollow and the medium passes first through the filter and then through the oscillating element.

14 Claims, 2 Drawing Figures

TO PUMP

MICROBALANCE AND METHOD FOR MEASURING THE MASS OF MATTER SUSPENDED WITHIN A FLUID MEDIUM

BACKGROUND AND SUMMARY OF THE INVENTION

This invention relates to the measurement of the mass of particulate or other forms of matter contained within a medium such as air or other fluids. It concerns itself both with a method and apparatus for making such measurements.

This invention represents an improvement on the method and apparatus described in U.S. Pat. No. 3,926,271, the contents of which are hereby incorporated by reference. Hereinafter, said patent shall be referred to as the "microbalance patent."

The apparatus described in the microbalance patent can be used for the measurement of the mass of particles and other matter contained within a gaseous or liquid medium through the use of impaction or other techniques wherein the matter is deposited on substrate 30, shown in FIG. 1 thereof. The impaction technique involves directing a flow of the medium on the substrate so that matter contained in said medium will be deposited on the substrate. This process, while perfectly adequate for many applications, is nevertheless subject to certain shortcomings. Obviously, only a certain percentage of the matter contained within a medium will be deposited, the remaining matter either bouncing off the substrate or being carried away from it or around it in the local turbulence created at the surface of the substrate. It would, of course, be desirable if a higher percentage of the matter whose mass is to be determined could be deposited on the oscillating end of the elastic element 4 described in the microbalance patent.

In the present invention, this objective can achieved through the attachment of a filter to the oscillating end of the elastic element and passing the medium containing the matter through the filter. In the preferred embodiment, the oscillating element is provided with a channel running from its oscillating end through its base and the filter is attached so as to cover the opening of the channel at the oscillating end. The medium is preferably drawn through the element so that it will pass first through the filter and then through the element. The associated structures and apparatus described in the microbalance patent and its method of operation would remain the same. Of course, equivalent structures and apparatus could be substituted.

Basically then, this invention concerns itself primarily with a modification of the invention disclosed in the microbalance patent wherein the modification consists in substituting a filter for the substrate 30 and providing means for circulating the medium containing the matter whose mass is to be determined through the filter. As that is done, the mass can be determined, as disclosed in the microbalance patent, by monitoring the changes in resonant frequency as matter becomes entrapped in the filter. For liquids, real time measurement will generally not be feasible because the passage of liquid through the oscillating element has an obvious damping effect and because it is generally necessary to remove the liquid from the filter after the deposition of matter therein by evaporation of the liquid or some other process.

BRIEF DESCRIPTION OF THE DRAWINGS

Reference numerals used in the following description indicate the same parts as in the microbalance patent wherever possible.

Referring to FIG. 1, an oscillating tube 4 is shown to be clamped to the base of housing 2 by means of annular ring 14 and its lip 16. Tube 4 may be quartz or any other suitable elastic material. A tapered tube in accordance with the teachings of the microbalance patent is to be preferred. However, a non-tapered tube would be very adequate for some applications, such as monitoring the effluent of a smokestack, where a high degree of sensitivity is not critical. An elliptical tube cross-section is helpful in confining the oscillation to a single plane, thereby facilitating the sensing of the frequency of oscillation.

In FIG. 1, tube 4 is shown to have a channel 5 therein which extends through the entire length of tube 4. A fitting 17 serves as a conduit connecting channel 5 to a suitable pump (not shown) as indicated. Although the lead 22 and terminal 24 shown in FIG. 1 of the microbalance patent are not shown herein, it should be understood that they can be relocated as needed to accommodate the placement of fitting 17.

Figure 1:
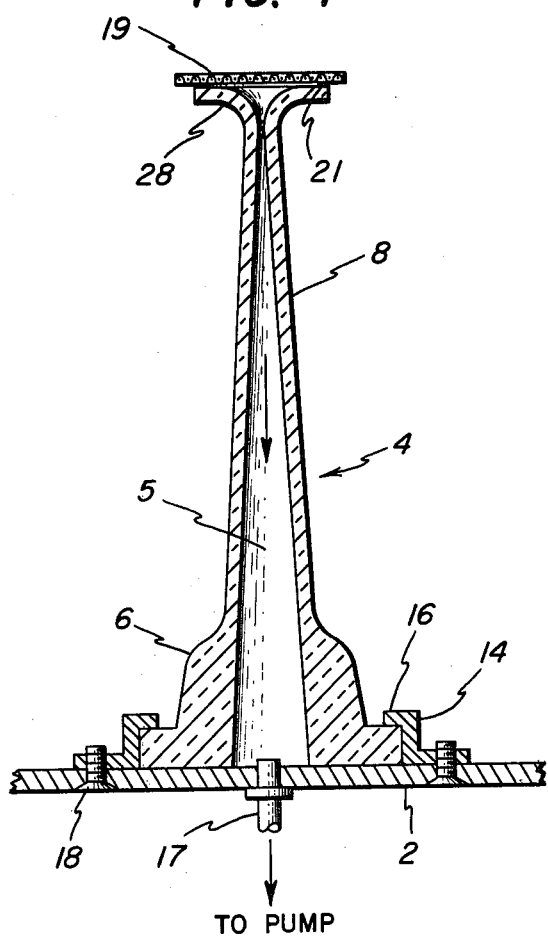
FIG. 1 is a sectional view in elevation of the oscillating element constructed in accordance with the present invention.

A suitable filter 19 is shown to be cemented by a suitable adhesive 21 to the flaired end of tube 4. Filter 19 may be of any suitable type having a composition suitable for the sampling environment and a porosity appropriate for the entrapment of the matter whose mass is to be measured and the medium in which that matter is contained. For work with ambient air, a hydrophobic filter made of Teflon was used having a one micrometer pore size. To eliminate temperature and humidity effects, it was found to be helpful to maintain the unit at 50° C. during operation.

The invention would typically be used to monitor the particulate content in ambient air. For such an application, ambient air would be drawn through filter 19 and channel 5 by a suitable vacuum pump.

As described in the microbalance patent, the element 4 would be oscillated in a clamped-free mode at a resonant frequency. As particles became entrapped within filter 19, thereby increasing the mass being oscillated, the resonant frequency would change. By the same process described in the microbalance patent, the mass of the particles entrapped can be determined by measuring the changes in resonant frequency.

Figure 2:
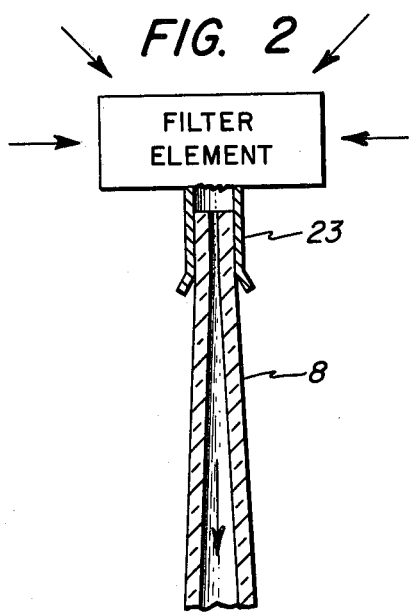
FIG. 2 is a fragmentary view in cross-section of the oscillating end of the element shown in FIG. 1 with an alternate method of filter attachment shown schematically.

FIG. 2 shows an alternate embodiment of a portion of the invention. The basic purpose of this embodiment is to provide a means whereby the filter element can be easily removed and exchanged for other filter elements. For this embodiment, flaired portion 28 of vibrating section 8 is eliminated. The filter would be mounted on a suitable sleeve 23 which would be slideably fitted to section 8. To ensure a complete seal between sleeve 23 and section 8, a suitable grease or dissolvable glue may be used.

There are clearly a variety of modifications that could be made to the above described invention without departing from its essential principles. It is intended to encompass all such modifications within the scope of the following claims.

What is claimed is:

1. Apparatus for measuring the mass of matter suspended in a medium comprising:
   an elongate elastic element having a first end which is anchored and a second end free to oscillate;
   filter means attached to the free end for receiving matter whose mass is to be measured;
   means for driving said element so that its second end with the filter means attached will oscillate at a resonant frequency;
   means for passing the medium containing the matter through the filter means as it oscillates in order to deposit the matter thereon; and
   means for sensing changes in the resonant frequency of oscillation of said element and filter as they oscillate.

2. The invention of claim 1 wherein the passing means includes a channel running through the elastic element.

3. The invention of claim 2 wherein the medium is passed through the filter before being passed through the channel.

4. The invention of claim 1, 2 or 3 wherein the medium is a gas.

5. The invention of claim 1, 2 or 3 wherein the medium is a liquid.

6. The invention of claim 1 wherein the elastic element is tapered from its first end to its second end.

7. The invention of claim 6 wherein the passing means includes a channel running through the elastic element.

8. The invention of claim 7 wherein the medium is passed through the filter before being passed through the channel.

9. The invention of claim 6, 7 or 8 wherein the medium is a gas.

10. The invention of claim 6, 7 or 8 wherein the medium is a liquid.

11. The invention of claim 1 wherein the filter means are removably attached to the elastic element whereby various forms of filters may be substituted therefor while using the same element.

12. A method for measuring the mass of matter suspended in a medium comprising the steps of:
    oscillating an elongate elastic element at a resonant frequency in a clamped-free mode, said element having a filter on said end;
    passing the medium through the filter as the elastic element oscillates so as to entrap the matter on the filter; and
    sensing changes in the resonant frequency of oscillation of said element and filter during the passing step.

13. The method of claim 12 wherein the oscillating element has a channel therein and wherein the passing step includes passing the medium through the channel.

14. The method of claim 13 wherein the filter covers an end of the channel and the medium is passed first through the filter and then through the channel.

* * * * *